United States Patent [19]

Cervola

[11] Patent Number: 4,995,418
[45] Date of Patent: Feb. 26, 1991

[54] FERTILIZER SPRINKLER APPARATUS

[76] Inventor: William F. Cervola, 6856 Espanita St., Long Beach, Calif. 90815

[21] Appl. No.: 423,226

[22] Filed: Oct. 18, 1989

[51] Int. Cl.⁵ .......................... B05B 7/14; B01D 11/02
[52] U.S. Cl. ...................................... 137/268; 422/282
[58] Field of Search ............................ 137/268, 205.5; 422/282; 239/310

[56] References Cited

U.S. PATENT DOCUMENTS

| | | | |
|---|---|---|---|
| 445,909 | 2/1891 | Shontz | 137/205.5 X |
| 1,176,126 | 3/1916 | Benedict | 137/268 X |
| 1,335,802 | 4/1920 | Stewart | 422/282 |
| 1,740,879 | 12/1929 | Sonner | 137/268 |
| 2,057,785 | 10/1936 | Milburn | 239/226 X |
| 2,330,328 | 9/1943 | Bachman | 422/282 |
| 2,885,271 | 5/1959 | Kersh | 137/268 X |
| 3,134,546 | 5/1964 | Laughlin | 239/226 X |
| 4,340,078 | 7/1982 | Pasley | 137/268 X |

Primary Examiner—Alan Cohan
Attorney, Agent, or Firm—Richard C. Litman

[57] ABSTRACT

An apparatus for the doping of water with dissolved fertilizer for application to vegetation by a sprinkler system. The present invention provides an apparatus that can be either manufactured with or adapted to a sprinkler system to provide fertilizer to the water exiting a sprinkler system. The present invention contains no moving parts. It utilizes the characteristics of water and fluid flow to accomplish its purpose. The apparatus is designed to provide easy removal from the sprinkler system so that it may be refilled with the appropriate fertilizing agent.

1 Claim, 2 Drawing Sheets

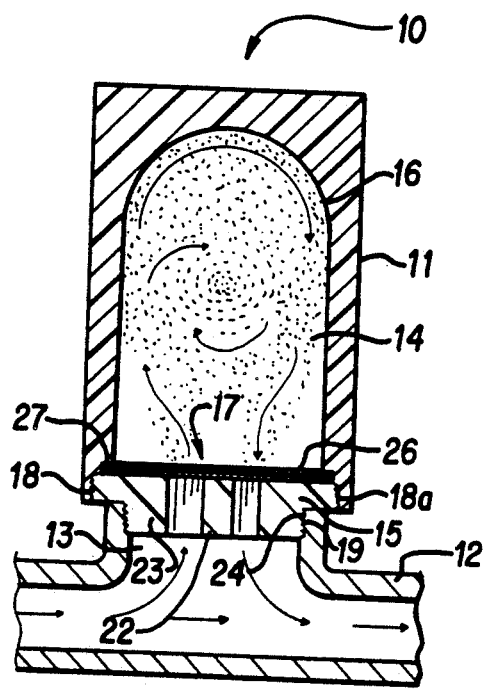
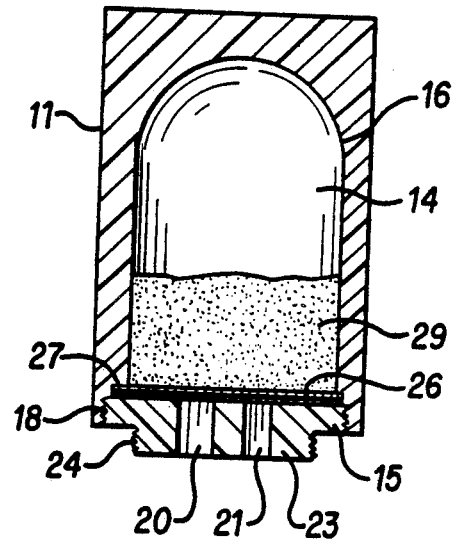
FIG. 1  FIG. 2
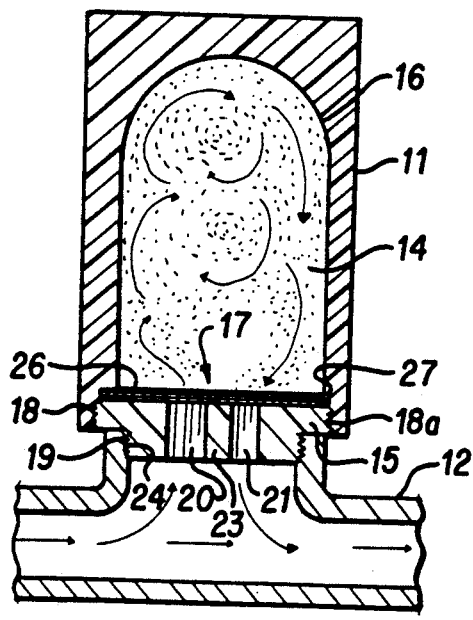
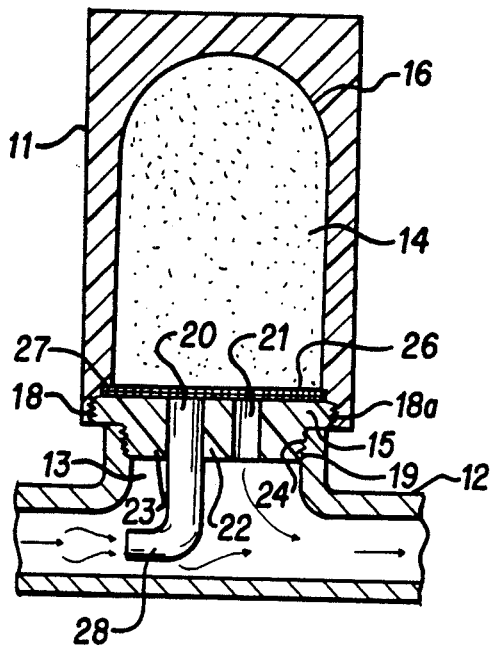
FIG. 3  FIG. 4

FERTILIZER SPRINKLER APPARATUS

BACKGROUND OF THE INVENTION

1. Field of the Invention

The present invention relates to sprinkler systems. More specifically, the present invention relates to those sprinkler systems which can provide fertilizer enriched water to vegetation. The present invention is a passive system which can be attached to an existing sprinkler system to add predetermined quantities of fertilizer to the system water supply.

2. Description of the Prior Art

The prior art does not include a water addition system that can be controlled to add specific amounts of material to water prior to dispersal, as described and claimed herein. U.S. Pat. No. 2,057,785 issued to F. S. Milburn on Oct. 20, 1936 discloses an apparatus for fertilizing. Milburn teaches a method of adding fertilizer to water wherein water is passed through the fertilizer from the top of the main chamber. A screen is placed at the bottom of the chamber to prevent the removal of fertilizer from the main chamber. The Milburn apparatus differs substantially from the present invention in two respects. First, Milburn connects the inlet and outlet water supply and return to opposite ends of the main chamber. Though effective, there is a more effective mixing of the fertilizer with the water in the present invention, especially when one considers that the present invention creates essentially a fluidized bed of water and fertilizer within the main mixing chamber. Second, the Milburn fertilizer requires that the water supply be discontinued should new fertilizer be needed. The present invention avoids this difficulty.

U.S. Pat. No. 3,134,546 issued to M. P. Laughlin on May 26, 1964 discloses an automatic chemical distributor. Laughlin describes a method for adding fertilizer to the outlet discharge of a sprinkler system. The Laughlin distributor differs from the present invention in that it adds fertilizer to the fluid stream after it has already left the sprinkler spray nozzle. The present invention adds fertilizer in diluted form before the water mixture is sprayed onto the vegetation. In this manner, the present invention provides a homogeneous flow of fertilizer to areas requiring such nutrition, whereas the Laughlin apparatus may provide an uneven distribution of chemical nutrients.

U.S. Pat. No. 4,456,176 issued to J. L. Agius on June 26, 1984 discloses a fertilizing system. The Agius system incorporates a large number of components. The present invention avoids this cumbersome and expensive approach to the fertilizing problem. Moreover, the present invention can be adapted to a home water system by being attached to a house water spigot or the like. The Agius system offers no such compatibility.

Accordingly, the present invention offers a new and unique method of adding fertilizer to sprinkler water prior to the discharge of the water onto vegetation. The system is adaptable to any water supply, and it offers a simple and functional approach to the problem. However, it should be noted at this point, that the present invention, though focusing on the usefulness of fertilizer disbursement, may be used for any number of chemical disbursement applications.

SUMMARY OF THE INVENTION

Accordingly, it is an object of the present invention to provide an apparatus that may be adapted to a sprinkler system to add a predetermined amount of fertilizer to the system water. Such a system may complement any sprinkler system since it can provide both water and nutrients to vegetation simultaneously.

It is an additional object of the present invention to provide a fertilizing sprinkler system which has no moving parts.

It is yet another object of the present invention to provide a fertilizer sprinkler system that is simple to maintain.

It is still another object of the present invention to provide a fertilizer sprinkler system wherein fertilizer can be added or removed as desired.

It is another object of the present invention to provide a fertilizing sprinkler system with a removable fertilizer container to facilitate the addition of fertilizer to the system water.

It is yet another object of the present invention to provide a removable cap to the fertilizer chamber so that fertilizer may be added while the apparatus remains in place.

It is still another object of the present invention to provide a fertilizing sprinkler system which uses the pressures associated with flowing water to its advantage.

It is yet another object of the present invention to provide a fertilizing sprinkler system wherein the amount of fertilizer added to the system water can be controlled by controlling the diameter of the inlet and outlet holes to the fertilizer container.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

FIG. 1 is a cross-sectional side elevation illustration of the present invention showing all pertinent components.

FIG. 2 is a cross-sectional side elevation illustration of the fertilizer chamber when at rest.

FIG. 3 is a cross-sectional side elevation illustration of the fertilizer chamber when activated.

FIG. 4 is a cross-sectional side elevation illustration of the present invention showing the placement of the tube for force flow into the mixing chamber.

Similar reference characters designate corresponding parts throughout the various figures of the drawings.

DESCRIPTION OF THE PREFERRED EMBODIMENT

Figure 5:
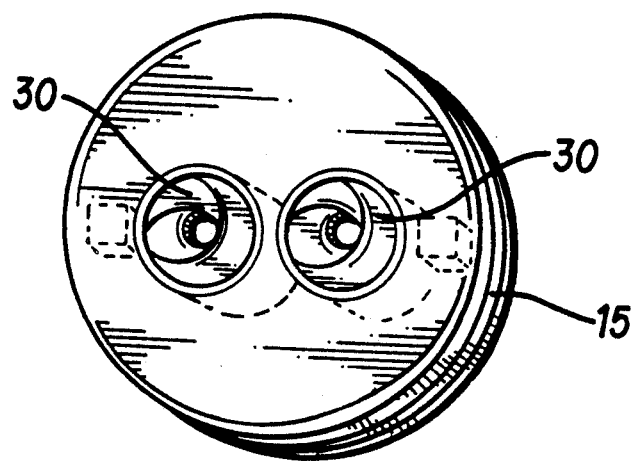
FIG. 5 is an expanded isometric of the chamber cap showing the addition of mechanical flow restrictors to control the diameter of both the inlet port and the outlet port.

In order to describe the present invention, this description is divided into two subparts. The first of which is entitled "Apparatus" and it describes the manner in which the parts of the fertilizer system 10 is assembled. The second subpart entitled "Operation" provides a description of how the parts described in the "Apparatus" operate in unison.

Apparatus

The present invention can be constructed in one of two different fashions, both of which provide the appropriate fertilizing effect through any sprinkler system. The fertilizing sprinkler system is generally designated 10 in FIG. 1. The fertilizing sprinkler 10 is generally composed of a fertilizing chamber 11 connected to a water conduit 12. The water conduit 12 is simply a rigid conduit composed of any suitable material such as copper or bronze. The water conduit 12 may be designed so that it can be screwed onto the water faucet of a household. It may also be designed as a component in an existing sprinkler system, whether above ground or below ground. The water conduit 12 contains an opening 13 at its top most portion. The opening 13 has a threaded area 19 to accept the threaded portion 24 of the water conduit connection area 22 of the chamber cap 15.

The fertilizing chamber 11 can be divided into two separate components, the mixing chamber 14 and the chamber cap 15. The mixing chamber 14 is simply a container substantially in the shape of a cylinder. The inner surface of the mixing chamber 14 is also substantially cylindrical in shape with a hemispherical shape 16 at one end. At the end opposite the hemispherical shape 16 there is located an opening 17 into the fertilizing chamber 11. Threaded grooves 18 are provided around the opening 17. The chamber cap 15, also fitted with threaded protrusions 18a, screws into this opening to provide a water-tight seal.

The chamber cap 15 contains three primary features, the inlet port 20, the outlet port 21, and the water conduit connection area 22. The water conduit connection area 22 is a cylindrical protrusion 23 that extends from the bottom surface of the chamber cap 15. The cylindrical protrusion 23 is threaded about its periphery with a threaded area 19 so that it may threadedly engage the opening 13 of the water conduit 12. Both the inlet port 20 and the outlet port 21 extend through the chamber cap 15.

As aforementioned, the chamber cap 15 screws into the fertilizing chamber 11. A non-corroding screen 26 of predetermined mesh size is placed between the chamber cap 15 and the fertilizing chamber 11. The non-corroding screen 26 is held in place by the chamber cap 15 once tightened in place. The fertilizing chamber 11 contains a lip 27 at its lowermost portion above the threaded grooves 18 of the opening 17. The placement of the screen 26 between the lip 27 and the chamber cap 15 provides the necessary surface area to fix the screen 26 in place when the apparatus 10 is operating. It is also possible that the screen 26 may just lie over the openings 20 and 21 without being secured. This would allow for easy removal of the screen 26 for cleaning or replacement.

In an alternate embodiment, an L-shaped tube 28 may be inserted into the inlet port 20. This embodiment is illustrated in FIG. 4. The tube 28 would extend vertically downward from the inlet port 20 and open to the flow of the system water. In this manner, the tube 28 could make use of the kinetic energy of the flowing water to assist in the mixing of the water and fertilizer 29 within the fertilizing chamber 11.

Figure 6:
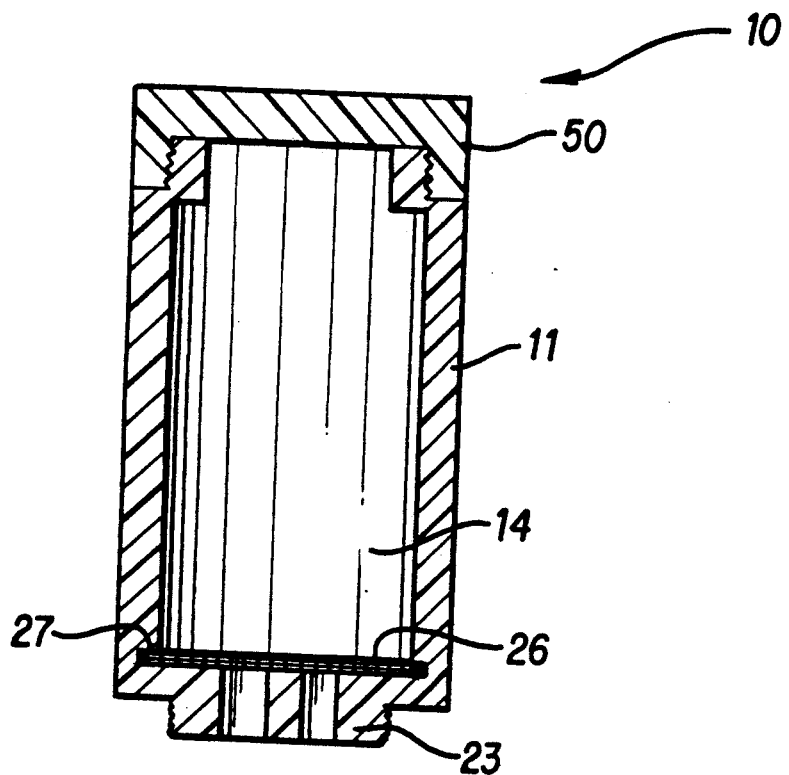
FIG. 6 is a cross-sectional illustration of an alternate embodiment of the present invention having a removable top.

In an alternate embodiment shown in FIG. 6, a removable top 50 is provided which may screw onto the top of the fertilizer chamber 11. The removable top 50 threadedly engages the top of the chamber 11. The removable top 50 can function as a means to open the chamber 11 to add fertilizer while the fertilizing chamber 11 remains in place. Notice that in this embodiment the chamber cap 15 has been replaced by forming the fertilizing chamber 11 into one unit.

A non-corroding screen 26 of predetermined mesh size is placed at the bottom of the fertilizing chamber 11. The non-corroding screen 26 rests over the openings 20 and 21. By unscrewing the top cap 50, more fertilizer can be introduced into the mixing chamber 14. It is not necessary to turn off the water supply when the cap 50 is unscrewed because the fertilizing chamber 11 would contain any water and fertilizer mixture. The screen 26 allows for retention of the fertilizer within the fertilizing chamber 11, allowing the water to enter the opening 20 and mix with the fertilizer inside the mixing chamber 14 and then exit out the opening 21.

Operation

In order to fill the mixing chamber 14 with fertilizer 29, one simply removes the chamber cap 15 from the fertilizing chamber 11. Following this, the screen 26 must be removed. With the fertilizing chamber 11 inverted, the mixing chamber can be filled with fertilizer 29. The screen 26 and chamber cap 15 are then replaced. The assembled apparatus can then be screwed into the opening 13 provided on the water conduit 12. If so provided, the removable top 50 may be removed so that fertilizer 29 may be added to the fertilizing chamber at the end opposite that having the chamber cap 15.

During operation, it may become necessary to add additional fertilizer 29 to the system 10. In this situation, the fertilizing chamber 11 can be removed from the chamber cap 15 while the chamber cap 15 remains in place over the water conduit 12. The same filling technique described above is used. The fertilizing chamber is then placed atop the chamber cap 15 still in place over the water conduit 12. In this application, if there exist no flow restrictors over the inlet port 20 and the outlet port 21, the water to the system will need to be turned off. This will prevent spray of water from the inlet port 20 and the outlet port 21 when the fertilizer chamber 11 when removed. Again, if so provided, the removable cap 50 may be removed while the fertilizer chamber 11 remains threadedly affixed to the water conduit 12. In this case the water supply need not be switched off.

For maximum benefits to be derived from the sprinkler apparatus 10, the threads 24 and the threads 18 may be counter oriented. In other words, the threads 24 and 18 are created on the appropriate components such that they do not "face" the same direction. Alternatively, the threads on the removable cap 50 may be counter oriented to the threads 24 on the cylindrical protrusion on the chamber cap 15. This allows the ability to refill the fertilizer chamber 11 without discontinuing the water supply. Were the threads 24 and 18 counter ground, the fertilizer chamber 11 could be removed from the chamber cap 15 without the possibility of removing both simultaneously. Thus, the threads 24 and 18 may be counter ground to facilitate operation of the present invention.

Water from a source such as a home water system flows primarily through the water conduit 22. However, a small portion of the water is tapped from the main supply by the inlet port 20 in order to fill the fertilizing mixing chamber 14. The water that enters the fertilizing mixing chamber 14 is allowed to mix with and dissolve the fertilizer 29 therein contained. The mixing action provides a maximum dissolution action. The water that exits the mixing chamber 14 through the outlet port 21 is then doped with fertilizer 29. The doped water then reenters the main stream where it mixes with the water en route to the sprinklers associated with the system.

The hemispherical shape 16 located at the top most portion of the mixing chamber 14 may aid in the mixing of the water and fertilizer 29 within the mixing chamber 14 by redirecting the upwardly directed water flow from the inlet port 20. In so doing, the hemispherical shape 16 helps to create a turbulent mixing of the water and the fertilizer 29 within the mixing chamber 14. However, though the hemispherical shape 16 is provided, it is not essential to the functioning of the apparatus 10. The top most region of the chamber cap 15 provides the bottom surface of the mixing chamber 14. The planar shape of the chamber cap 15 surface provides a sufficient break in the flow of the fluid in the mixing chamber 14 to assure that no continuous flow paths are established. The flat surface assures a non-continuous path. The combination of the planar chamber cap 15 and the hemispherical shape 16 may help to create a good mixture of fertilizer 29 and water within the mixing chamber 14.

The screen 26 placed between the chamber cap 15 and the mixing chamber 14 prevents the outward flux of particulate material from the mixing chamber 14. Specifically, the screen 26 prevents the fertilizer 29 from flowing out of the mixing chamber 14. This prevents the fertilizer 29 from being carried along the water flow path to the sprinkler heads and clogging the spray nozzles of the sprinkler system.

If the chamber cap 15 is installed within the water conduit 12, without any extraneous components, the action of the pressure within the water conduit will force water into the mixing chamber 14. Since there in no means by which the fertilizer 29 is agitated under this construction, the water simply becomes saturated with fertilizer 29. As a result, the density of the fluid increases and it is pulled equally downward through the inlet port 20 and the outlet port 21. Thus, there is a slow leaching process wherein the fertilizer 29 is added to the system water. This is true when the water flow is fairly low.

However, if an L-shaped tube 28 is added to the inlet port 20 such that the downward end faces into the stream of the flow of the water, the kinetic energy of the fluid can be used to an advantage. The flow of water will create a greater pressure on the end of the tube 28 than will be exerted by the system pressure on the outlet port 21. The higher pressure exerted on the end of the tube 28 will be transferred along the length of the tube into the mixing chamber 14. Since the only pressure working against the inlet flow pressure is the pressure exerted on the outlet port 21 opening, a flow will be set up within the mixing chamber 14 wherein there will be positive fluid flow from inlet port 20 to outlet port 21.

Continuing with the tube 28 adaptation, the tube size could be manipulated to control the amount of force fluid flow through the mixing chamber 14. In this manner, the amount of fertilizer 29 which is introduced into the water system per unit time could be closely controlled. The user would simply need replace the tube 28 with the a tube of the appropriate diameter in order to control the fluid flow. It is also possible to control the diffusion of fertilizer 29 into the water system by controlling the diameters of the inlet port 20 and outlet port 21. Control of the diameters of the inlet port 20 and the outlet port 21 would serve the same function even in the absence of the tube 28. Control of the diameters of the inlet port 20 and the outlet port 21 could be accomplished manually, however, a mechanical restrictor means 30 as described later in this discussion is the preferred method.

Where the flow of water through the water conduit 12 is turbulent, then the water is easily forced into the fertilizing chamber 11 and the size of the ports are important. The size of the ports will control the amount of water entering and exiting from the fertilizing chamber 11. The water will mix with the fertilizer 29 as described. The fertilizer 29 will mix with the water, disolve, and be forced into the water conduit 12 where it will be carried to the sprinkler head or other dispersion apparatus.

In an alternate embodiment of the fertilizing sprinkler system 10, the diameters of the inlet port 20 and the outlet port 21 could be controlled during operation should the need arise. A mechanical restrictor 30 could be installed at each of the port locations, 20 and 21. Thus, the person owning the system could control the flow of fertilizer 29 into the water system as needed. A control box or computer could be provided to manipulate the mechanical restrictors 30. This would be especially useful where the different types of vegetation within reach of the sprinkler head each have different nutritional needs. Were a sprinkler head used that sprays water in a circular fashion, it is possible that the nutrient flow could be programmed such that the nutrients are applied to specific arc lengths of the path of the water spray. In fact, the mechanical restrictors 30 could be controlled by a computer to periodically introduce fertilizer 29 into the water system in long term irrigation applications. Moreover, the mechanical flow restrictors 30 could be closed to allow refilling of the fertilizer chamber 11 without interrupting the flow of water in the system 10.

It is to be understood that the present invention is not limited to the sole embodiment described above, but encompasses any and all embodiments within the scope of the following claims.

I claim:

1. An apparatus for the doping of water with fertilizer comprising:
    a fertilizer chamber having an inner surface and an outer surface,
    said inner surface being substantially cylindrical,
    said inner surface having an open end,
    said inner surface meeting with said outer surface at said open end,
    said inner surface having a threaded surface at said open end,
    said threaded surface being removably engagable with a chamber cap,
    said chamber cap defining two openings therethrough,
    said chamber cap being cylindrical in shape and having a threaded edge,
    said threaded edge threadably engaging with said threaded surface of said open end of said inner surface of said fertilizer chamber,
    said chamber cap having a threaded cylindrical element protruding therefrom,
    a water conduit,
    said threaded cylindrical element of said chamber cap threadably engaging said water conduit, and a noncorrosive screen juxtaposed between said chamber cap and said fertilizer chamber preventing the fertilizer contained within said fertilizer chamber from exiting from said openings;

wherein said threaded surface at said open end of said fertilizer chamber and said threaded edge of said chamber cap oppose the orientation of the threads of said threaded cylindrical element protruding from said chamber cap.

* * * * *